US006886332B2

(12) United States Patent
Kubinski et al.

(10) Patent No.: US 6,886,332 B2
(45) Date of Patent: May 3, 2005

(54) BI-ROTATIONAL, TWO-STAGE HYDRAULIC SYSTEM

(75) Inventors: Paul T. Kubinski, Brooklyn Park, MN (US); David J. Anderson, Plymouth, MN (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 10/351,926

(22) Filed: Jan. 24, 2003

(65) Prior Publication Data

US 2003/0145588 A1 Aug. 7, 2003

Related U.S. Application Data

(60) Provisional application No. 60/354,354, filed on Feb. 5, 2002.

(51) Int. Cl.[7] .............................................. F16J 31/02

(52) U.S. Cl. .............................................. 60/475; 60/476

(58) Field of Search .......................... 60/473, 476, 430, 60/475

(56) References Cited

U.S. PATENT DOCUMENTS 2,366,388 A * 1/1945 Crosby ........................ 60/430
3,864,911 A 2/1975 Gellatly et al.
3,903,698 A 9/1975 Gellatly et al.
4,008,571 A 2/1977 Evans
4,195,480 A 4/1980 Shelby et al.
4,342,164 A 8/1982 Claassen
4,811,562 A 3/1989 Hoffmann et al.
5,179,836 A * 1/1993 Dantlgraber ................. 60/430

* cited by examiner

*Primary Examiner*—Edward K. Look
*Assistant Examiner*—Michael Leslie
(74) *Attorney, Agent, or Firm*—Christopher H. Hunter

(57) ABSTRACT

A hydraulic system for an actuator provides staged operation during extend and retract. A pair of reversible pumps are conjointly driven by a reversible motor. A relief valve in the retract circuit directs fluid to tank when fluid pressure increases above a predetermined value. An unloader valve in the extend circuit is responsive to pressure at a first stage pump to direct flow to tank when the pressure increases above a second predetermined value. A non-return check valve connected between the pumps in the extend circuit closes the flow circuit to the second stage pump during high loads, so that the flow from the second stage pump goes to tank, and the return flow from the actuator goes only to the first stage pump. The non-return check valve is responsive (via a signal line to the retract circuit portion) to the pressure in the extend and retract circuit portions.

16 Claims, 3 Drawing Sheets

BI-ROTATIONAL, TWO-STAGE HYDRAULIC SYSTEM

CROSS-REFERENCE TO RELATED CASES

The present application claims the benefit of the filing date of U.S. Provisional Application Ser. No. 60/354,354; filed Feb. 5, 2002, the disclosure of which is expressly incorporated herein by reference.

FIELD OF THE INVENTION

The present invention relates generally to hydraulic systems for controlling the operation of an actuator, such as a hydraulic cylinder.

BACKGROUND OF THE INVENTION

Actuators, such as hydraulic cylinders (also referred to as "hydraulic rams"), are used in a variety of applications to move or lift an object. Some of these are double-acting—meaning that they are designed to move a load in both the extend and retract directions. One particular application of this type of actuator is for the tilt and trim system for outboard marine engines. On many large outboard engines, two hydraulic rams perform the trim function (set the prop at a desired angle under thrust); while a separate cylinder performs the tilt function (tilt the prop out of water for storage and trailering). The trim rams have a limited stroke that defines the maximum angle that the engine can be set for high prop thrust, and must be capable of operating under high loads. In contrast, the tilt cylinder has a long stroke and typically operates under less load. It is preferred that the trim function occur rather slowly for optimum performance of the motor, while the tilt function occur relatively rapidly, so that the boat can be quickly inserted into or removed from the water. The trim and tilt cylinders can have separate hydraulic systems, and either a four-way valve or reversible pump can be used in each system to operate the cylinders in the extend and retract directions. As can be appreciated, the separate systems add cost, complexity and require significant space on the engine.

It is known to use a common pumping source (pump) for both the tilt cylinder and trim rams. This reduces the cost and complexity of the system somewhat, but as can be appreciated, still requires the cost and complexity of a tilt cylinder and separate trim rams. Since only a single pump is used, these systems also provide the extend and retract movements at the same speed, which can be undesirable. It is also known to use a single hydraulic cylinder and a common pumping source, which performs both the trim and tilt functions, with a first portion of the cylinder rod travel used for trim, and a further portion of the cylinder rod travel used for tilt. This further reduces the complexity of the system, but still provides only a single speed for both the trim and tilt functions.

On the other hand, it is known to provide a hi-low or staged pump for an actuator which operates at low flow, low speeds under high load; and at a high flow, high speeds under low loads. In one of these systems, shown in U.S. Pat. No. 3,903,698, a pair of conjointly-operated reversible pumps and a reversible motor provide a hi-low or staged hydraulic circuit during the extend movement of the actuator. Both the pumps provide high flow under low loads and low pressures; and only one of the pumps provides low flow under high loads and higher pressures. The output of the other pump is directed to tank through an unloader valve. The '698 system has some advantages over the prior systems in the extend mode, however, in the retract mode, the entire return flow from the actuator is directed to tank, and the cylinder is retracted—at one speed—by the flow provided by both pumps. As such, the actuator offers only a single retract stage, regardless of the load on the actuator, which again, can be undesirable in some applications.

Applicants therefor believe there is a demand for an improved hydraulic system for an actuator, particularly for marine applications which provides staged (hi-low) operation, in both the extend and retract modes of operation.

SUMMARY OF THE INVENTION

The present invention thereby provides an improved hydraulic system for an actuator, which provides staged (hi-low) operation, in both the extend and retract modes of operation. The system is simple and compact, which reduces the costs associated with procuring and maintaining the system.

According to the present invention, the system includes a pair of reversible pumps which are driven conjointly by a reversible motor. A relief valve is located in one circuit portion from the retract (cylinder) side of the actuator and is responsive to fluid pressure to direct flow to tank/reservoir when fluid pressure in that circuit portion increases above a predetermined value. The relief valve, in essence, compensates for the different capacities of the retract and extend chambers of the cylinder.

An unloader valve is provided in another circuit portion from the extend (head) side of the actuator and is responsive (via a pilot signal line to the extend port of the first stage pump) to fluid pressure in that circuit portion. The unloader valve fluidly connects the second stage pump to tank/reservoir when the fluid pressure in the extend circuit portion increases above a second predetermined value.

A non-return check valve is also provided in the extend circuit portion between the first and second stage pumps. The non-return check valve closes the extend circuit to the second stage pump during high loads, so that the flow from the second stage pump is directed to tank/reservoir, and only the flow from the first stage pump is applied to the actuator. The non-return check valve is responsive to the fluid pressure in the retract circuit portion (via a pilot signal line) and the extend circuit portion.

The unloader valve and non-return check valve work in conjunction, such that the system operates in stages, with both pumps providing flow to the actuator at lower loads and pressures; while at higher loads and pressures, the second stage pump is effectively isolated, and only the first stage pump provides flow to the actuator. This allows the first stage pump to be driven by the prime mover (motor) to higher pressures.

An overpressure relief valve can also be provided on the extend circuit, to protect against excessive pressures caused by uneven loads on the actuator.

The pumps and valves described can be assembled into a compact housing. Simple spring-biased ball valves and spool valves provide the necessary flow control through the housing. This reduces the size and complexity of the system, and makes the system easy to manufacture and repair. Thus, a single, cost-effective hydraulic system for an actuator is provided by the present invention, which provides staged operation in both the extend and retract modes of operation.

Further features of the present invention will become apparent to those skilled in the art upon reviewing the following specification and attached drawings.

DETAILED DESCRIPTION OF THE PREFERRED EMBODIMENT

Figure 2:
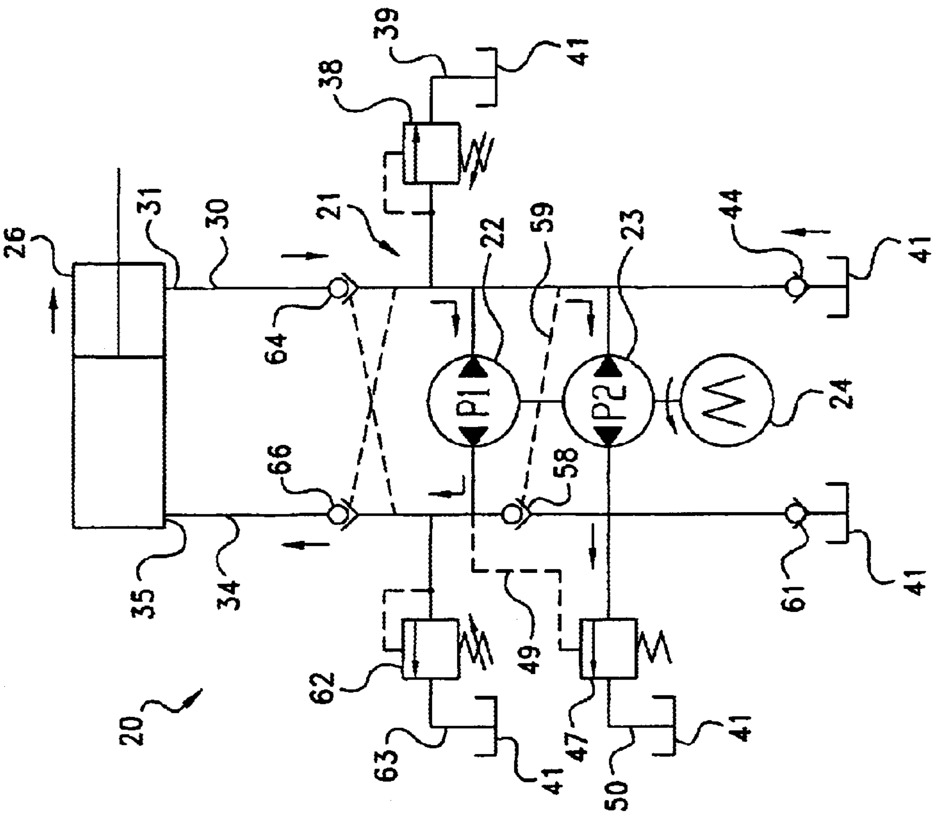
FIG. 2 is a schematic diagram of the circuit, illustrating the circuit in a extend—hi load mode of operation.
Figure 1:
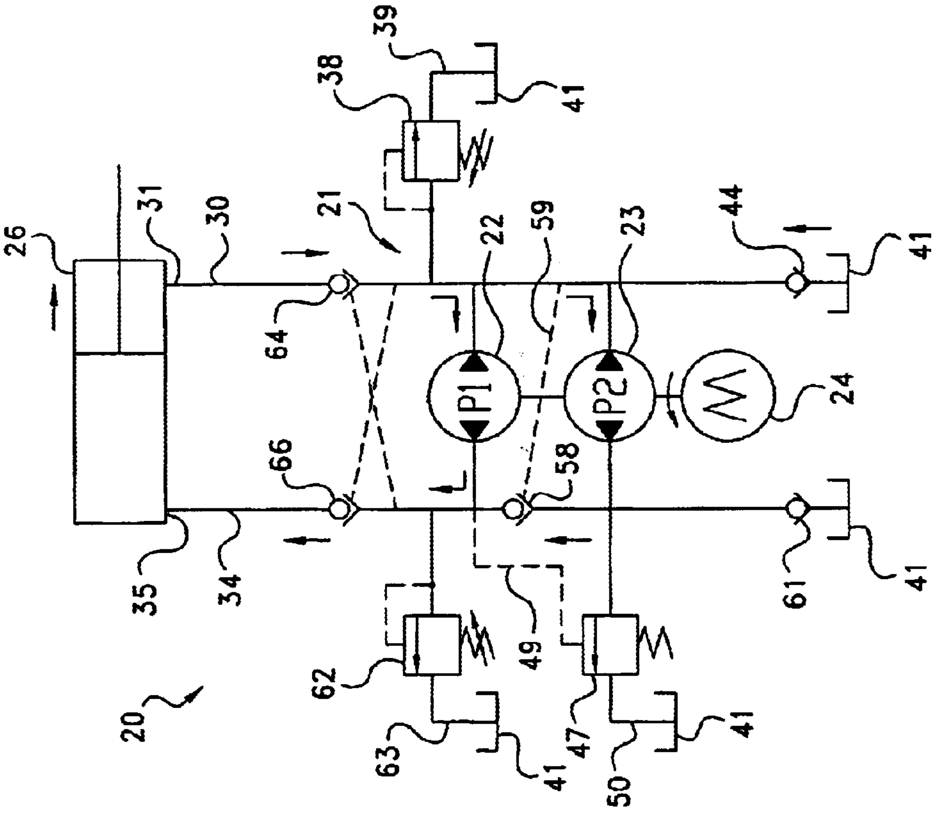
FIG. 1 is a schematic diagram of a hydraulic fluid circuit constructed according to the principles of the present invention, illustrating the circuit in a extend—low load mode of operation.

Referring to the drawings, and initially to FIGS. 1–4, a hydraulic system is illustrated generally at 20, including a pump assembly, indicated generally at 21, having a pair of bi-rotational first and second stage pumps 22, 23, connected for conjoint operation. The pumps are driven in both directions by a prime mover, i.e., a reversible motor 24. In one stage (FIGS. 1 and 3), flow from the two pumps is combined for high volume, low pressure and low load operation; while in another stage (FIGS. 2 and 4), flow from the second stage pump 23 is unloaded, and flow from the first stage pump 22 is used for low volume, high pressure and high load operation. The pump assembly is fluidly connected to an actuator such as a hydraulic cylinder 26. In one application, where the actuator is connected to an outboard marine engine (not shown), the first stage flow can be used to provide the trim function for the engine, while the second stage can be used to provide the tilt function for the engine.

It should be appreciated that the present invention is useful for a variety of applications, beyond the marine application described above, where a two-stage actuator having extend and retract modes is necessary to move or lift an object. Such other applications include, for example, moving the boom on an aerial lift truck. In addition, while the present invention is particularly useful for a hydraulic cylinder with an elongated piston rod, it should be appreciated that the present invention could also find usefulness in other applications, such as in rotary actuators. Over-all, it should be appreciated that the present invention is useful for a variety of applications and arrangements.

Each pump 22, 23 preferably comprises an intermeshing gear pump of the type commonly known, and which is sized appropriately for the particular application. It is possible that other types of pumps besides gear pumps could be useful for the present invention, and as such, it should be appreciated that this is only a preferred pump. For conjoint operation, one gear component of one of the pumps is fixedly connected (such as by a coupling) to a gear component of the other of the pumps, such that all the gear components are operational together.

A fluid circuit interconnects pumps 22, 23 and actuator 26. A first fluid circuit portion 30 from the retract (cylinder) port 31 of the actuator is connected to the first port of both pumps 22, 23; while a second fluid circuit portion 34 from the extend (head) port 35 of the actuator is connected to the second port of both pumps 22, 23. The fluid circuit portions 30, 34, are of course bi-directional, depending on the direction of motor 24 and pumps 22, 23, with the ports of the pumps thereby providing either pressure or suction depending upon the mode of operation of the system (i.e., whether the actuator is in "extend" or "retract" mode).

A relief valve 38 is located in the first, retract circuit portion 30, between the first stage pump 22 and the actuator, and provides a first drain path 39 to reservoir/tank 41 when fluid pressure in circuit portion 30 increases above a predetermined value. Relief valve 38 preferably comprises a normally closed, adjustable, spring-biased ball valve, which is set to open to accommodate the difference in fluid volumes in the extend and retract chambers of the cylinder. When the actuator is in the "retract mode" (FIGS. 3 and 4), relief valve 38 opens to allow a portion of the fluid from one or both pumps to be directed to drain to compensate for the smaller volume of the retract chamber of the actuator. Conversely, when the actuator is in the "extend" mode (FIGS. 1 and 2), the relief valve will be closed, as the volume received from the retract chamber of the actuator is less than that which is being provided to the extend chamber. The pressure at which the relief valve 38 is set can be easily determined upon simple calculation and/or experimentation.

The retract circuit portion 30 is also connected directly to reservoir/tank 41 through a one-way check valve 44. Check valve 44 allows the pumps 22, 23 to draw fluid from the tank when necessary in the extend mode (see, e.g., FIGS. 1 and 2). The check valve 44 preferably comprises a simple ball valve.

An unloader valve 47 is located in the extend/second circuit portion 34 and is responsive (via a pilot signal line 49 to the extend port of the first stage pump 22) to fluid pressure in circuit portion 34. Unloader valve 47 preferably comprises a normally closed, spring-biased ball valve with a spool valve portion responsive to pressure applied across the pilot signal line 49. The unloader valve 47 fluidly connects the second stage pump 23 through a second drain path 50 to tank/reservoir 41 when the fluid pressure in the extend circuit portion increases above a second predetermined value (i.e., during the high-load stages of FIGS. 2 and 4).

A non-return check valve 58 is located in the second circuit portion 34 between the extend ports for the pumps. The non-return check valve 58 is responsive to fluid pressure in the first circuit portion 30 via a pilot signal line 59, as well as to fluid pressure in the second circuit portion on opposite sides of the check valve. The non-return check valve preferably comprises a ball valve with a spool valve portion responsive to pressure applied across the pilot signal line 59. The check valve, in essence opens when the pressure from the cylinder side of the actuator received through first circuit portion 30 (via line 59) in conjunction with the pressure on the side of the check valve leading to the second/extend port of the second stage pump 23 is greater than the pressure on the side of the check valve leading to the first stage pump and the actuator (i.e., during the high-load stages of FIGS. 2 and 4). The non-return check valve 58 closes the extend port of the actuator to the second stage pump 23 during high loads, so that the flow from the second stage pump 23 is directed to tank/reservoir 41 through unloader valve 47, and only the first stage pump provides flow to the actuator.

It should be appreciated that when the relief valve 38 is open, the pressure on the retract circuit portion 30 remains at the set pressure of the relief valve. This is the maximum pressure applied across signal line 59 to the non-return check valve which again, is balanced between the retract circuit portion pressure (which is held to the set point of the relief valve) in conjunction with the pressure at the second/extend port of the second stage pump, versus the pressure on the extend circuit portion seen at the second/extend port of the first stage pump. The unloader valve typically will be set to open at a pressure at least equal to, and preferably greater than, the set pressure of the relief valve; however, this may not be the case in all applications, and the unloader valve could be set to open at a lower pressure than the relief valve.

The unloader valve and non-return check valve work in conjunction, such that the systems works in stages, with both pumps providing flow to the actuator at lower loads and pressures, and the second stage pump being unloaded to tank at higher loads and pressures, with only the first stage pump providing flow to the actuator. The second stage pump is thereby effectively isolated from the actuator during higher loads and pressures and the first stage pump can be driven by the prime mover to higher pressures.

Figure 4:
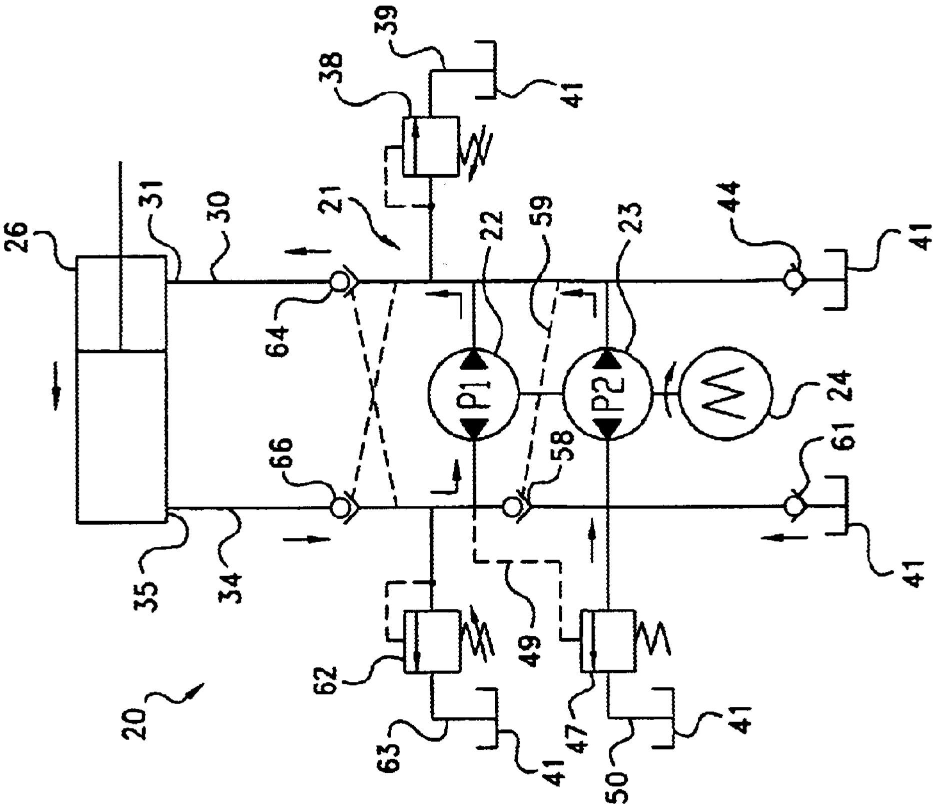
FIG. 4 is a schematic diagram of the circuit, illustrating the circuit in a retract—hi load mode of operation.
Figure 3:
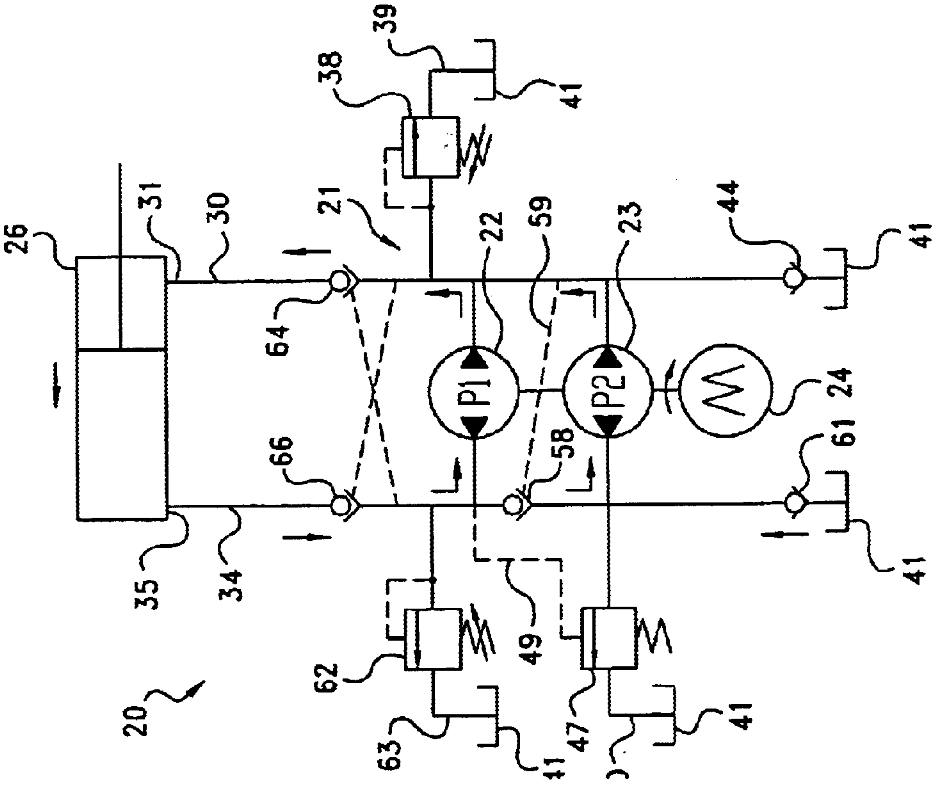
FIG. 3 is a schematic diagram of the circuit, illustrating the circuit in a retract—low load mode of operation.

The extend fluid circuit portion 34 is also connected to reservoir 41 through check valve 61, such that the pumps can draw fluid from the reservoir as necessary during retract (FIGS. 3 and 4). As with check valve 44, check valve 61 is preferably a simple ball valve.

An overpressure relief valve 62 is preferably provided in the extend circuit portion between the first stage pump and the actuator, to protect against excessive pressures caused by uneven loads on the actuator. Overpressure relief valve 62 is preferably constructed the same as relief valve 38, and includes a normally closed, adjustable, spring-biased ball valve. Overpressure relief valve 62 is set at a pressure (maximum allowed pressure) higher than unloader valve 47, and directs flow through third drain path 63 to tank 41 when the maximum allowed pressure point is reached.

The reservoir/tank connections described above can be to different reservoirs, however, it is preferred that the reservoirs be common, or at least fluidly interconnected.

To maintain the cylinder of the actuator in a set position when the motor is shut down, a pair of check valves 64, 66 are provided in the retract and extend circuit portions 30, 34, respectively, between the pumps and the actuator ports. The valves are responsive to pressure in the opposite circuit portion (via pilot signal lines) and are open when the pumps are operating, and closed when they are not. Check valves 64, 66 are preferably simple spring-biased ball valves.

The operation of the hydraulic system should be apparent from the above, but will also be briefly discussed. During operation in the extend mode of the actuator (FIGS. 1 and 2), the pumps 22, 23 are operated conjointly to provide fluid through the extend circuit portion 34 into the extend chamber through extend port 35. Since the flow from the retract chamber of the actuator is less than the flow being provided to the extend chamber, the pressure from the actuator is insufficient to activate relief valve 38, and as such, this valve stays shut, with the entire flow being provided to the two pumps. Additional flow is provided from tank 41 through check valve 44 to compensate for the smaller flow being provided from the retract chamber. In the low-load stage of operation (FIG. 1), the unloader valve 47 remains closed, and flow from both pumps is provided through extend circuit portion 34 and through extend port 35 to the extend chamber of the actuator. Since the pressure on the retract circuit portion 30 (applied through pilot line 59) and on the extend circuit portion 34 upstream of the non-return check valve 58 is greater than the fluid pressure on the downstream side of this valve, the non-return check valve remains open.

In the high-load, extend mode of operation (FIG. 2), that is, when pressure in the extend circuit portion 34 at the output port of the first stage pump increases above the set point of the unloader valve 47 (applied via line 49), the unloader valve opens, and directs flow from the second stage pump 23 through drain path 50 to tank 41. When this happens, the non-return check valve 58 closes, as the pressure downstream from the valve becomes greater than the pressure upstream, in conjunction with the pressure across pilot line 50. As such, the second stage pump is effectively isolated, and only the flow from the first stage pump is applied to the extend chamber of the actuator. The first stage pump 22 can thereby be driven to higher pressures to move the actuator.

Referring now to FIG. 3, showing the retract mode of operation at low load, the pumps 22, 23 are operated in the reverse mode, and fluid is provided to the retract chamber of the actuator through the retract port 31. At low flows (below the set point of the unloader valve 47) the unloader valve remains closed. Likewise, the non-return check valve remains open, as the pressure upstream of the valve is less than the pressure downstream, in conjunction with the pressure across the pilot line 59. As such, and the flow is directed through both pumps to the retract chamber of the actuator. Additional flow is provided from tank 41 through check valve 61, as necessary. Since the extend chamber provides more flow than the extend chamber, excess flow is directed through relief valve 38 through drain path 39 to tank 41.

Finally, in the retract mode, high load (FIG. 4), the high pressure on extend circuit 34 causes unloader valve 47 to open, which likewise causes non-return check valve 58 to close, as the pressure upstream of the valve becomes greater than that downstream, in conjunction with the pressure applied across pilot line 59. The second stage pump 23 draws flow from tank through check valve 61 as well as through unloader valve 47 (at loads above the set pressure of the unloader valve). The flow from the second stage pump 22 is applied through relief valve 38 to tank. Likewise, excess flow from the first stage pump (caused by the mismatch between the extend and retract chambers) is applied through relief valve 38 to tank. The remaining flow (held at the pressure of the relief valve 38) is applied through retract circuit portion 30 through retract port 31 to the retract chamber of the actuator.

In any of the operations described above, if the pressure on the extent circuit portion 34 increases above the set point of the overpressure relief valve 62 (such as through an unbalanced load on the cylinder), the excess pressure will be directed through drain path 63 to reservoir to protect the system.

Figure 5:
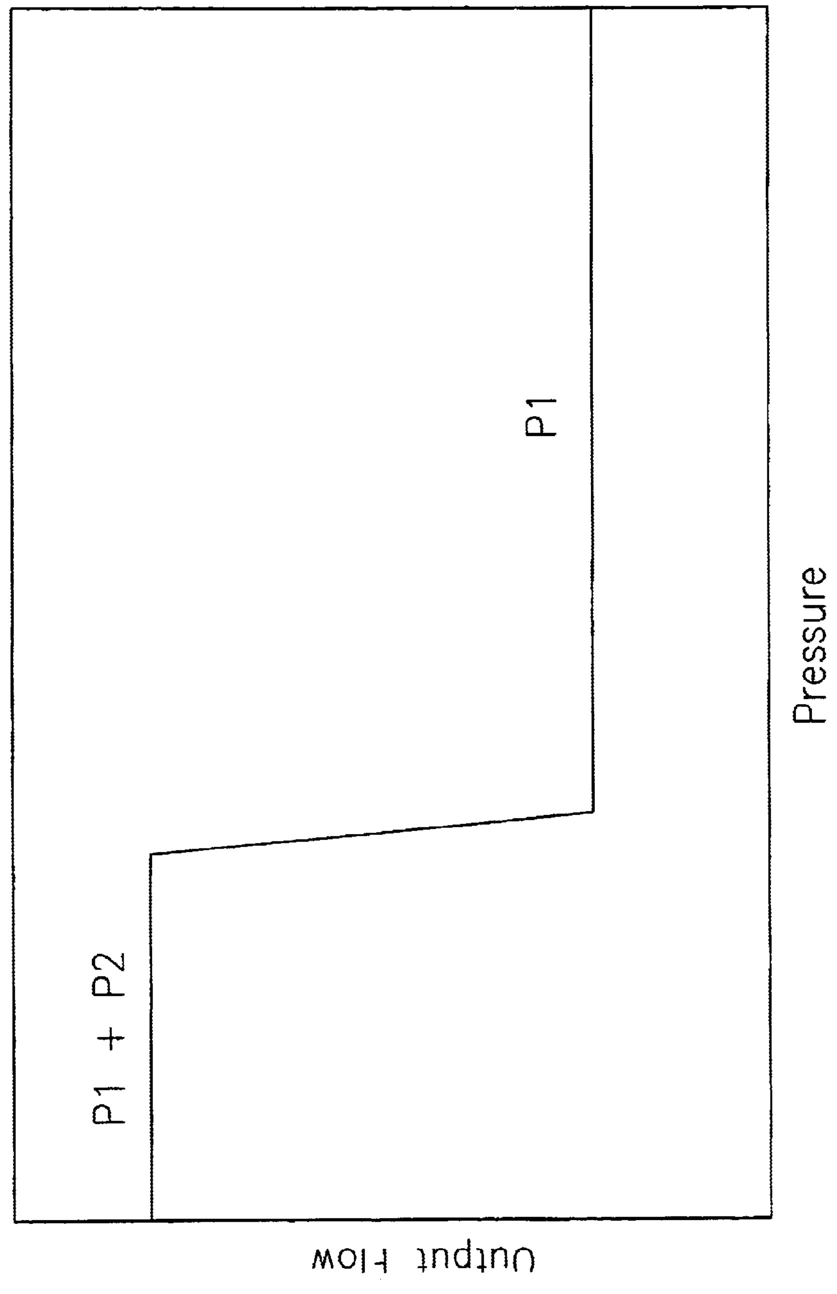
FIG. 5 is a graph illustrating the output flow versus the pressure in the hydraulic circuit of the present invention.

The flow and pressure curve for the hydraulic system of the present invention is illustrated in FIG. 5. The curve is identical for the extend as well as retract modes of operation.

The structure of the pump assembly described above can vary, but a particularly useful form of the pump assembly includes a plurality of plates stacked in adjacent, surface-to-surface relation with each other, with each plate including a portion of one or more pump components, one or more the flow paths, and/or one or more valves to control the flow through the pumps.

As such, as described above, the present invention provides an improved hydraulic system for an actuator, which provides staged (hi-low) operation, in both the extend and retract modes of operation. The system is simple and compact, which as should be appreciated, reduces the costs associated with procuring and maintaining the system.

What is claimed is:

1. In a system for operating a hydraulic actuator, where the actuator has first and second ports, the system including:

first and second reversible pumps, each of which has first and second ports which are capable of assuming pressure and suction functions depending on the direction of operation of the respective pump;

a prime mover for operating the pumps in one direction or another; a reservoir for supplying fluid to the pumps and for receiving excess fluid;

a fluid circuit for directing fluid between the reservoir, the ports of the pumps and the ports of the actuator, the first ports of both pumps fluidly connected via a first circuit portion to the first port of the hydraulic actuator, and the second ports of both pumps being fluidly connected via a second circuit portion to the second port of the hydraulic actuator;

a relief valve in the first fluid circuit portion operationally responsive to fluid pressure in the first circuit portion, the relief valve allowing flow from the first circuit portion through a first drain path to the reservoir when the fluid pressure in the first circuit portion increases above a predetermined value;

a non-return check valve in the second circuit portion between the second ports of the first and second pumps operationally responsive to fluid pressure in the first and second circuit portions for controlling flow between the second pump and the hydraulic actuator, with the non-return check valve:

a) in an open position allowing flow between the second pump and the hydraulic actuator when i) the pressure in the first circuit portion in conjunction with the pressure in the second circuit portion at the second port of the second pump is greater than ii) the pressure in the second circuit portion at the second port of the first pump, such that flow is provided between both pumps and the hydraulic actuator; and b) in a closed position preventing flow between the second pump and the hydraulic actuator when i) the pressure in the first circuit portion in conjunction with the pressure in the second circuit portion at the second port of the second pump is less than ii) the pressure in the second circuit portion at the second port of the first pump, such that flow is provided only in the second circuit portion between the first pump and the hydraulic actuator;

an unloader valve operationally responsive to fluid pressure in the second circuit portion and fluidly connected to the second pump, the unloader valve allowing flow through a second drain path from the second pump to the reservoir when the fluid pressure in the second circuit portion at the second port of the first pump is above a threshold value; and first and second one-way check valves in the fluid circuit respectively controlling fluid from the reservoir to the first and second circuit portions during operation of the pumps, wherein when the pumps operate in one direction where flow is provided to the first port of the hydraulic actuator, flow is provided i) from the second port of the actuator and through both pumps to the first port of the actuator at low loads when the non-return check valve is open and the unloader valve is in a closed condition; and ii) from the second port of the actuator and through the first pump, and from the reservoir through the second pump, at high loads when the non-return check valve is closed and the unloader valve is in the open position.

2. The system as in claim 1, wherein the threshold value is equal to or greater than the predetermined value.

3. The system as in claim 1, wherein the first and second circuit portions are bi-directional.

4. The system as in claim 1, further including an over-pressure relief valve in the second fluid circuit portion operationally responsive to fluid pressure in the second circuit portion for controlling the flow between the pumps and reservoir, with the over-pressure relief valve allowing flow from the second circuit portion through a third drain path to the reservoir when the fluid pressure in the second circuit portion increases above a maximum value.

5. The system as in claim 1, wherein the unloader valve is operationally responsive to fluid pressure at the second port of the first pump.

6. The system as in claim 1, wherein the prime mover is reversible, and conjointly drives both pumps.

7. The system as in claim 1, further including a first supply path from the reservoir to the first port of the second pump, and a second supply path from the reservoir to the second port of the second pump, and the first and second one-way check valves are each located in a respective supply path.

8. A hydraulic system including a double acting hydraulic cylinder with retract and extend chambers and first and second ports into the retract and extend chambers respectively, first and second reversible pumps, each of which has first and second ports which are capable of assuming pressure and suction functions depending on the direction of operation of the respective pump;

a prime mover for operating the pumps in one direction or another; a reservoir for supplying fluid to the pumps and for receiving excess fluid;

a fluid circuit for directing fluid between the reservoir, the ports of the pumps and the ports of the actuator, the first ports of both pumps fluidly connected via a first circuit portion to the first port of the hydraulic actuator, and the second ports of both pumps being fluidly connected via a second circuit portion to the second port of the hydraulic actuator;

first valve means in the first fluid circuit portion operationally responsive to fluid pressure in the first circuit portion, for controlling flow from the first circuit portion through a first drain path to the reservoir when the fluid pressure in the first circuit portion increases above a predetermined value;

second valve means in the second circuit portion between the second ports of the first and second pumps operationally responsive to fluid pressure in the first and second circuit portions for controlling flow between the second pump and the hydraulic actuator, with the second valve means:

a) in an open position allowing flow between the second pump and the hydraulic actuator when i) the pressure in the first circuit portion in conjunction with the pressure in the second circuit portion at the second port of the second pump is greater than ii) the pressure in the second circuit portion at the second port of the first pump, such that flow is provided between both pumps and the hydraulic actuator; and b) in a closed position preventing flow between the second pump and the hydraulic actuator when i) the pressure in the first circuit portion in conjunction with the pressure in the second circuit portion at the second port of the second pump is less than ii) the pressure in the second circuit portion at the second port of the first pump such that flow is only provided in the second circuit portion between the first pump and the hydraulic actuator;

third valve means operationally responsive to fluid pressure in the second circuit portion and fluidly connected to the second pump, for controlling flow through a second drain path from the second pump to the reservoir when the fluid pressure in the second circuit portion at the second port of the first pump is above a threshold value; and one-way valve means controlling flow from the reservoir to the first and second circuit portions, wherein when fluid is provided to the retract chamber and the hydraulic cylinder is in a retract movement, flow is provided i) from the extend chamber through both pumps to the retract chamber at low loads when the second valve means is in an open condition and the first valve means is in a closed condition; and ii) from the extend chamber only through the first pump, and from the reservoir through the third valve means and the one-way valve means to the second pump, at high loads when the second valve means is in a closed condition and the first valve means is in an open condition.

9. The hydraulic system as in claim 8, further including a first supply path from the reservoir to the first port of the second pump, and a second supply path from the reservoir to the second port of the second pump, and the one-way valve means includes one-way check valve means in each respective supply path.

10. In a system for operating a hydraulic actuator in extend and retract modes, where the actuator has internal extend and retract chambers and extend and retract ports for the extend and retract chambers, respectively, the system including:

first stage and second stage reversible pumps, each of which has first and second ports which are capable of assuming pressure and suction functions depending on the direction of operation of the respective pump;

a prime mover for conjointly operating the pumps in one direction or another;

a fluid circuit for directing fluid between the ports of the pumps and the ports of the actuator, the first ports of both pumps fluidly connected via a retract circuit portion to the retract port of the hydraulic actuator, and the second ports of both pumps being fluidly connected via an extend circuit portion to the extend port of the hydraulic actuator;

first valve means in the retract circuit portion operationally responsive to fluid pressure in the retract circuit portion to compensate for different fluid capacities of the extend and retract chambers, the first valve means directing flow from the retract circuit portion through a first drain path to reservoir when actuator is in the extend mode of operation;

second and third valve means operationally responsive to fluid pressure in the retract and extend circuit portions for i) allowing flow between both pumps and the actuator when the load on the actuator is below a second predetermined value in both the extend and retract modes of operation; and ii) allowing flow between the first stage pump and the actuator but isolating the actuator from the second stage pump when the load on the actuator is above the second predetermined value, in both the extend and retract modes of operation; and fourth and fifth valve means controlling flow from the reservoir to the retract and extend circuit portions respectively during extend and retract operation of the hydraulic actuator, wherein when the hydraulic actuator is in the retract operation, flow from both pumps is provided to the retract chamber during low load conditions when the second valve means is in an open condition and the first valve means is in a closed condition; and ii) from the extend chamber through the first pump, and from the reservoir to the second pump, at high loads when the second valve means is in a closed condition and the first valve means is in an open condition.

11. The system as in claim 10, wherein the second valve means is located between the second ports of the first and second stage pumps, and is operationally responsive to fluid pressure in the retract and extend circuit portions for controlling fluid flow between the second stage pump and the hydraulic actuator, with the second valve means:

a) in an open position allowing flow between the second stage pump and the hydraulic actuator when i) the pressure in the retract circuit portion and the pressure in the extend circuit portion at the second port of the second stage pump is greater than ii) the pressure in the extend circuit portion at the second port of the first stage pump, such that flow is provided between both pumps and the hydraulic actuator; and b) in a closed position preventing flow between the second stage pump and the hydraulic actuator when i) the pressure in the retract circuit portion and the pressure in the extend circuit portion at the second port of the second stage pump is less than ii) the pressure in the retract circuit portion at the second port of the first stage pump, such that flow is provided only in the extend circuit portion between the first stage pump and the hydraulic actuator.

12. The system as in claim 10, wherein the third valve means is operationally responsive to fluid pressure in the extend circuit portion and fluidly connected to the second stage pump, the third valve means allowing flow through a second drain path from the second stage pump to the reservoir when the fluid pressure in the extend circuit portion at the second port of the first stage pump is above the second predetermined value.

13. The system as in claim 10, wherein the first valve means is a relief valve, the second valve means is a non-return check valve, and the third valve means is an unloader valve.

14. The hydraulic system as in claim 10, further including a first supply path from the reservoir to the first port of the second pump, and a second supply path from the reservoir to the second port of the second pump, and the fourth and fifth valve means each include one-way check valve means in a respective supply path.

15. In a system for operating a hydraulic actuator in extend and retract modes of operation, where the actuator has first and second ports into retract and extend chambers, respectively, the system including:

first and second reversible pumps, each of which has first and second ports which are capable of assuming pressure and suction functions depending on the direction of operation of the respective pump;

a prime mover for operating the pumps in one direction or another; a reservoir for supplying fluid to the pumps and for receiving excess fluid;

a fluid circuit for directing fluid between the reservoir, the ports of the pumps and the ports of the actuator, the first ports of both pumps fluidly connected via a first circuit portion to the first port of the hydraulic actuator, and the second ports of both pumps being fluidly connected via a second circuit portion to the second port of the hydraulic actuator;

a relief valve in the first fluid circuit portion operationally responsive to fluid pressure in the first circuit portion, the relief valve allowing flow from the first circuit portion through a first drain path to the reservoir when the fluid pressure in the first circuit portion increases above a predetermined value during the retract mode of operation;

a non-return check valve in the second circuit portion between the second ports of the first and second pumps operationally responsive to fluid pressure in the first and second circuit portions for controlling flow between the second pump and the hydraulic actuator, with the non-return check valve:

(a) in an open position allowing flow between the second pump and the hydraulic actuator when i) the pressure in the first circuit portion in conjunction with the pressure in the second circuit portion at the second port of the second pump is greater than ii) the pressure in the second circuit portion at the second port of the first pump, such that flow is provided between both pumps and the hydraulic actuator; and (b) in a closed position preventing flow between the second pump and the hydraulic actuator when i) the pressure in the first circuit portion in conjunction with the pressure in the second circuit portion at the second port of the second pump is less than ii) the pressure in the second circuit portion at the second port of the first pump, such that flow is provided only in the second circuit portion between the first pump and the hydraulic actuator;

an unloader valve operationally responsive to fluid pressure in the second circuit portion and fluidly connected to the second pump, the unloader valve allowing flow between the reservoir and second pump when the fluid pressure in the second circuit portion at the second port of the first pump is above a threshold value, the flow being i) from the second pump to the reservoir when the hydraulic actuator is in the extend mode of operation, and ii) from the reservoir to the second pump when the hydraulic cylinder is in the retract mode of operation; and a first supply path from the reservoir to the first port of the second pump, and a second supply path from the reservoir to the second port of the second pump, a first one-way check valve in the first supply path and a second one-way check valve in the second supply path, the check valves respectively controlling fluid from the reservoir to the first and second ports of the second pump during operation of the hydraulic actuator, wherein flow is provided from the reservoir, through the second check valve to the second port of the second pump, and from the second pump through the first port of the second pump and to the first circuit portion, wherein flow is provided during the retract mode of operation i) from the extend chamber through both pumps to the retract chamber when the relief valve is in a closed condition and the non-return check valve is open; and ii) from the extend chamber through only the first pump to the retract chamber, and from the reservoir through the second pump, when the relief valve is in an open condition and the non-return check valve is closed.

16. In a system for operating a hydraulic actuator in extend and retract modes of operation, where the actuator has first and second ports into retract and extend chambers, respectively, with the retract chamber having a smaller volume than the extend chamber, the system including:

first and second reversible pumps, each of which has first and second ports which are capable of assuming pressure and suction functions depending on the direction of operation of the respective pump;

a prime mover for operating the pumps in one direction or another; a reservoir for supplying fluid to the pumps and for receiving excess fluid;

a fluid circuit for directing fluid between the reservoir, the ports of the pumps and the ports of the actuator, the first ports of both pumps fluidly connected via a first circuit portion to the first port of the hydraulic actuator, and the second ports of both pumps being fluidly connected via a second circuit portion to the second port of the hydraulic actuator;

a relief valve in the first fluid circuit portion operationally responsive to fluid pressure in the first circuit portion, the relief valve allowing flow from the first circuit portion through a first drain path to the reservoir when the actuator is in the retract mode of operation and preventing flow through the first drain path when the actuator is in the extend mode of operation;

a non-return check valve in the second circuit portion between the second ports of the first and second pumps operationally responsive to fluid pressure in the first and second circuit portions for controlling flow between the second pump and the hydraulic actuator, the non-return check valve moving from an open position during low pressure loads on the actuator, to a closed position at high pressure loads on the actuator and isolating the second pump from the extend chamber of the actuator; and an unloader valve operationally responsive to fluid pressure in the second circuit portion and fluidly connected to the second pump, the unloader valve allowing flow between the reservoir and the second pump during high pressure loads, and preventing flow between the reservoir and the second pump during low pressure loads, a first supply path from the reservoir to the first port of the second pump, and a second supply path from the reservoir to the second port of the second pump, a first one-way check valve in the first supply path arid a second one-way check valve in the second supply path, the check valves allowing flow from the reservoir to the first and second circuit portions during operation of the hydraulic actuator, wherein flow is provided during the retract mode of operation i) from the extend chamber through both pumps to the retract chamber at low loads when the relief valve is closed and the non-return cheek valve is open; and ii) from the extend chamber through only the first pump to the retract chamber, and from the reservoir through the second pump, at high loads when the relief valve is open and the non-return check valve is closed.

* * * * *